(12) United States Patent
Xue et al.

(10) Patent No.: US 8,859,643 B2
(45) Date of Patent: Oct. 14, 2014

(54) ENCAPSULATED FLAME RETARDANTS FOR POLYMERS

(75) Inventors: Siqi Xue, Shanghai (CN); Jing Dreher, Stuttgart (DE); Heinz Herbst, Lörrach (DE)

(73) Assignee: BASF SE, Ludwigshafen (DE)

( * ) Notice: Subject to any disclaimer, the term of this patent is extended or adjusted under 35 U.S.C. 154(b) by 443 days.

(21) Appl. No.: 13/154,969

(22) Filed: Jun. 7, 2011

(65) Prior Publication Data

US 2011/0301279 A1    Dec. 8, 2011

Related U.S. Application Data

(60) Provisional application No. 61/351,956, filed on Jun. 7, 2010.

(51) Int. Cl.
   *C08K 9/02* (2006.01)
   *C08K 9/10* (2006.01)
   *C09K 21/12* (2006.01)

(52) U.S. Cl.
   CPC ..................................... *C09K 21/12* (2013.01)
   USPC ............. 523/204; 523/210; 524/80; 524/508; 524/605; 252/609

(58) Field of Classification Search
   USPC .................... 524/80, 508, 605; 523/210, 204; 252/609
   See application file for complete search history.

(56) References Cited

U.S. PATENT DOCUMENTS

| | | | |
|---|---|---|---|
| 6,084,012 A * | 7/2000 | Gareiss et al. | 524/80 |
| 6,329,451 B2 * | 12/2001 | Matsumoto et al. | 524/80 |
| 6,353,080 B1 * | 3/2002 | Gan et al. | 528/89 |
| 6,846,854 B2 * | 1/2005 | Wagner et al. | 523/210 |
| 2006/0100325 A1 | 5/2006 | Leite et al. | |
| 2007/0135551 A1 | 6/2007 | Okuda et al. | |

FOREIGN PATENT DOCUMENTS

| DE | 19619701 A1 | 11/1996 |
|---|---|---|
| JP | 2000263733 A | 9/2000 |

OTHER PUBLICATIONS

Gao, M., et al., "Thermal Degradation and Flame Retardancy of Epoxy Resins Containing Microencapsulated Flame Retardant," Proceedings Published 2008 by the American Chemical Society.

Lin, M., et al., "Mechanism of Mass-Transfer in Synthesis of Flame Retardant Microcapsules by Multiple Emulsion Method," Journal of Donghua University (Natural Science), Dec. 2007, vol. 33, No. 6, pp. 701-705.

International Search Report and Preliminary Examination Report in corresponding PCT application dated Sep. 2011.

* cited by examiner

*Primary Examiner* — Hannah Pak

(74) *Attorney, Agent, or Firm* — Drinker Biddle & Reath LLP

(57) ABSTRACT

The present invention relates to a process for producing particles which comprise at least one halogen-free flame retardant and which comprise at least one metal oxide or semimetal oxide, where the particle can be a core-shell particle with flame retardant in the core and metal oxide or semimetal oxide in the shell, or a particle in which the distribution of flame retardant and a metal oxide or semimetal oxide is in essence homogeneous. The present invention further relates to particles comprising at least one halogen-free flame retardant and comprising at least one metal oxide or semimetal oxide, to a polymer molding composition comprising said particles and comprising at least one thermoplastic or thermoset polymer, and also to the use of said particles in polymer molding compositions or for providing flame retardancy to polymer molding compositions.

8 Claims, No Drawings

ENCAPSULATED FLAME RETARDANTS FOR POLYMERS

CROSS-REFERENCE TO RELATED APPLICATIONS

This application claims benefit of U.S. provisional application 61/351,956, filed Jun. 7, 2010 which is incorporated by reference.

BACKGROUND OF THE INVENTION

The present invention relates to a process for producing particles which comprise at least one halogen-free flame retardant and which comprise at least one metal oxide or semimetal oxide, where the particle can be a core-shell particle with flame retardant in the core and metal oxide or semimetal oxide in the shell, or a particle in which the distribution of flame retardant and metal oxide or semimetal oxide is in essence homogeneous. The present invention further relates to particles comprising at least one halogen-free flame retardant and comprising at least one metal oxide or semimetal oxide, to a polymer molding composition comprising said particles and comprising at least one thermoplastic or thermoset polymer, and also to the use of said particles in polymer molding compositions or for providing flame retardancy to polymer molding compositions.

Composite materials comprising flame retardants and comprising other materials are known in the prior art.

PMSE Preprints (2008), 98, 533 to 535 discloses microcapsules which have a core-shell structure. Tris(2,6,7-trioxa-1-phosphabicyclo[2.2.2]octane-1-oxo-4-methanol) phosphate (trimer), is present as flame retardant within the core of said microcapsules. A melamine resin forms the shell of these microcapsules.

JP 2000263733 discloses a process for impregnating fibrous substrates with phenolic-resin lacquers which comprise microcapsules comprising phosphates.

Donghua Daxue Xuebao, Ziran Kexue Ban (2007), 33(6), 701 to 705, discloses core-shell particles comprising water-soluble dimethyl methylphosphonate (DMMP) as core material and the product of acetalization of PVA and GA (glutaraldehyde) as shell material, obtainable via an emulsion process.

The prior art does not disclose any particles which comprise a halogen-free, preferably water-insoluble, flame retardant in combination with at least one metal oxide or semimetal oxide, for example $SiO_2$, $TiO_2$ and/or $ZnO$. There is moreover no disclosed process in which, for example, silica is formed via a sol-gel process.

BRIEF SUMMARY OF THE INVENTION

In the light of the prior art, it is therefore an object of the present invention to bind liquid, halogen-free flame retardants by using metal oxide or semimetal oxide, in order to convert these to a free-flowing powder. The liquid, halogen-free flame retardants in bound form can then be used advantageously in polymer molding compositions.

Said objects are achieved via the process of the invention for producing particles comprising at least one halogen-free flame retardant and at least one metal oxide or semimetal oxide, which comprises at least the following steps:

(A) producing an aqueous emulsion comprising the at least one flame retardant and at least one precursor compound of the at least one metal oxide or semimetal oxide, (B) forming core-shell particles, where the at least one flame retardant is present in the core and the at least one metal oxide or semimetal oxide is present in the shell of the particles, and (C) optionally drying the core-shell particles from step (B), or (D) producing a mixture comprising water, at least one polar solvent, at least one halogen-free flame retardant, and at least one precursor compound of the at least one metal oxide or semimetal oxide, (E) converting the at least one precursor compound of the at least one metal oxide or semimetal oxide into the at least one metal oxide or semimetal oxide, in order to obtain a particle which comprises at least one metal oxide or semimetal oxide and which comprises at least one halogen-free flame retardant, and (F) optionally drying the particles from step (E).

DETAILED DESCRIPTION OF THE INVENTION

The individual steps of the two alternative processes of the invention are explained in detail below:

Process 1 of the invention for producing particles comprising at least one halogen-free flame retardant and comprising at least one metal oxide or semimetal oxide comprises at least the following steps:

(A) producing an aqueous emulsion comprising the at least one flame retardant and at least one precursor compound of the at least one metal oxide or semimetal oxide, (B) forming core-shell particles, where the at least one flame retardant is present in the core and the at least one metal oxide or semimetal oxide is present in the shell of the particles, and (C) optionally drying the core-shell particles from step (B).

Step (A):

Step (A) of process 1 of the invention comprises producing an aqueous emulsion comprising the at least one flame retardant and comprising at least one precursor compound of the at least one metal oxide or semimetal oxide.

The invention uses halogen-free flame retardants which are preferably insoluble in water. Another preferred embodiment of the invention uses halogen-free flame retardants which are liquid under standard conditions, i.e. at a temperature of 25° C. and at a pressure of about 1 bar (a).

In another embodiment, the flame retardants that can be used in the invention are solid under standard conditions, but melt below 100° C. The flame retardants that can be used in the invention are generally insoluble in water.

For the purposes of the present invention, "halogen-free" means that the flame retardants that can be used in the invention comprise no atoms selected from the halogens, i.e. fluorine, chlorine, bromine, and iodine. For the purposes of the present invention, "no atoms" means that the amounts of the said atoms are below the threshold of detection by analysis.

Preferred flame retardants of the present invention are liquid, halogen-free, P-comprising flame retardants. These flame retardants are well known to the person skilled in the art.

It is particularly preferable in the invention to use flame retardants corresponding to the following formulae (I)-(VI):

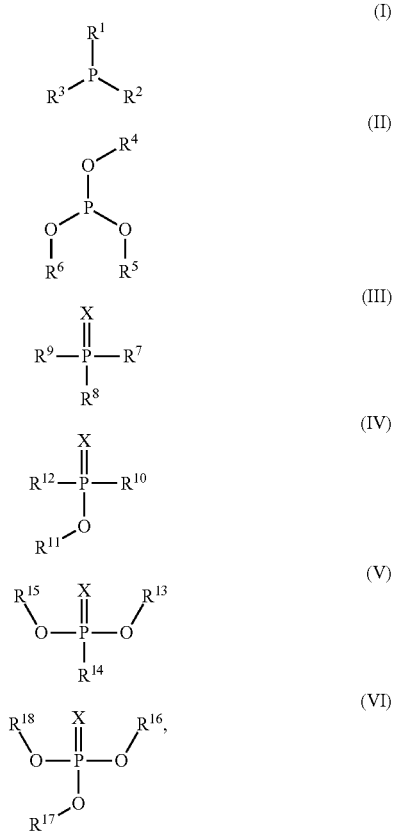

in which $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and X are mutually independently as described below:

$R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$ are mutually independently hydrogen, hydroxy group, or aryl, alkyl, and/or cycloalkyl moiety respectively optionally bearing functional groups.

X is mutually independently oxygen or sulfur.

An aryl moiety in the invention is a moiety which has a parent skeleton of from 6 to 30 carbon atoms, preferably from 6 to 18 carbon atoms, and which is composed of an aromatic ring or of a plurality of condensed aromatic rings. Examples of suitable parent skeletons are phenyl, naphthyl, anthracenyl, and phenanthrenyl. This parent skeleton can have no substitution, where all of the carbon atoms that can be substituted therefore bear hydrogen atoms, or it can have substitution at one of, at a plurality of, or at all of, the substitutable positions on the parent skeleton. Examples of suitable substituents are alkyl moieties, preferably alkyl moieties having from 1 to 8 carbon atoms, particularly preferably methyl, ethyl, or isopropyl, aryl moieties, preferably $C_6$-$C_{22}$-aryl moieties, particularly preferably $C_6$-$C_{18}$-aryl moieties, very particularly preferably $C_6$-$C_{14}$-aryl moieties, i.e. aryl moieties which have a phenyl, naphthyl, phenanthrenyl, or anthracenyl parent skeleton, where these in turn can be substituted or unsubstituted moieties, and heteroaryl moieties, preferably heteroaryl moieties which comprise at least one nitrogen atom, particularly preferably pyridyl moieties, and alkenyl moieties, preferably alkenyl moieties which bear a double bond, particularly preferably alkenyl moieties having a double bond and having from 1 to 8 carbon atoms.

Particularly preferred aryl moieties are those selected from the group consisting of phenyl, alkyl-substituted phenyl, naphthyl, and alkyl-substituted naphthyl.

An alkyl moiety in the invention is preferably a moiety having from 1 to 20 carbon atoms, particularly preferably from 1 to 10 carbon atoms, very particularly preferably from 1 to 8 carbon atoms. This alkyl moiety can be a branched or unbranched moiety and optionally can have interruptions by one or more heteroatoms, preferably N, O, Si or S. This alkyl moiety can moreover have substitution by one or more of the substituents mentioned in relation to the aryl groups. It is equally possible that the alkyl moiety bears one or more aryl groups. Any of the aryl groups listed above is suitable here. It is moreover possible that the alkyl moiety/moieties bear(s) one or more functional groups, preference being given to hydroxyalkyl moieties or cyanoalkyl moieties.

Particularly preferred alkyl moieties are those selected from the group consisting of methyl, ethyl, propyl, such as n-propyl and isopropyl, butyl, such as n-butyl, isobutyl, and tert-butyl, and octyl and its isomers.

A cycloalkyl moiety in the invention is preferably a cyclic moiety having from 3 to 20 carbon atoms, particularly preferably from 3 to 10 carbon atoms, very particularly preferably from 3 to 8 carbon atoms, for example 3, 4, 5, or 6. Said cycloalkyl moiety can have substitution or no substitution and can optionally have interruption by one or more heteroatoms, preferably N, O, Si, or S. The cycloalkyl moiety can have substitution by one or more of the substituents mentioned in relation to aryl groups. It is equally possible that the cycloalkyl moiety bears one or more aryl groups. Any of the aryl groups listed above is suitable here. It is moreover possible that the cycloalkyl moiety/moieties bear(s) one or more functional groups.

Particularly preferred cycloalkyl moieties are those selected from the group consisting of cyclopropyl, cyclobutyl, cyclopentyl, and cyclohexyl, and alkyl-substituted derivatives of these.

All of the moieties mentioned as $R^1$ to $R^{18}$ in the invention can bear functional groups.

Functional groups suitable in the invention are by way of example those selected from the group consisting of carbonyl group, and preferably carboxylic acid group, keto group, aldehyde group, ester group, amino group, amide group, hydroxy group, cyano group, thio group, and SCN group.

Compounds of the general formulae (I) to (VI) particularly preferred in the invention are those selected from the group consisting of triphenylphosphine (formula (I), where $R^1$, $R^2$, and $R^3$ are phenyl), diphenyl(o-tolyl)phosphine (formula (I), $R^1$, $R^2$ are phenyl, $R^3$ is o-tolyl), tributylphosphine oxide (formula (III), where $R^7$, $R^8$, and $R^9$ are butyl, and X is oxygen), trioctylphosphine oxide (formula (III), where $R^7$, $R^8$, and $R^9$ are octyl, and X is oxygen), diphenyl phosphite (formula (V), where $R^{13}$ and $R^{15}$ are phenyl, $R^{14}$ is hydrogen, and X is oxygen), triphenyl phosphite (formula (II), where $R^7$, $R^8$, and $R^9$ are phenyl), tris(nonylphenyl) phosphite (formula (II), where $R^7$, $R^8$, and $R^9$ are nonylphenyl), dimethyl methylphosphonate (formula (V), where $R^{13}$, $R^{14}$, and $R^{15}$ are methyl, and X is oxygen), dioctyl phenylphosphonate (formula (V), where $R^{13}$ and $R^{15}$ are octyl, and $R^{14}$ is phenyl, and X is oxygen), triphenyl phosphate (formula (VI), where $R^{16}$, $R^{17}$ and $R^{18}$ are phenyl, and X is oxygen), tritolyl phosphate (formula (VI), where $R^{16}$, $R^{17}$, and $R^{18}$ are o-tolyl, and X is oxygen), and mixtures thereof.

It is moreover possible in the invention to use, with preference, flame retardants corresponding to the following formulae (VII) and/or (VIII):

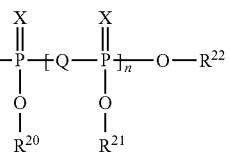

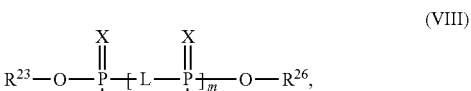
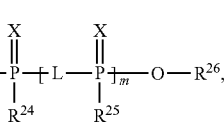

in which $R^{19}$, $R^{20}$, $R^{21}$, $R^{22}$, $R^{23}$, $R^{24}$, $R^{25}$, $R^{26}$, X, L, n and m are mutually independently as follows:

$R^{19}$, $R^{20}$, $R^{21}$, $R^{22}$, $R^{23}$, $R^{24}$, $R^{25}$, and $R^{26}$ are mutually independently hydrogen or aryl, alkyl and/or cycloalkyl moiety optionally bearing functional groups.

X is mutually independently oxygen or sulfur.

Q and L are mutually independently an organic group which has at least two hydroxy functions, where these provide bonding of the P atoms or, respectively, bonding to a further group Q or, respectively, L.

In one preferred embodiment of the process of the invention, Q and/or L in the compounds of the general formulae (VII) and, respectively, (VIII) has/have been selected mutually independently from the group consisting of resorcinol, hydroquinone, bisphenol A, bisphenol F, polycarbonate segments having terminal hydroxy groups, for example phenolic groups, and mixtures thereof. The hydrogen atoms in said compounds are cleaved on bonding to the P. This is known to the person skilled in the art.

As far as the aryl, alkyl, and/or cycloalkyl moieties present in the compounds of the general formula (VII) or (VIII) are concerned, the information provided above in relation to compounds (I) to (VI) applies.

$R^{19}$, $R^{20}$, $R^{21}$, and $R^{22}$ are preferably phenyl or alkyl-substituted phenyl. $R^{23}$, $R^{24}$, $R^{25}$, and $R^{26}$ are preferably methyl, phenol, phenyl or alkyl-substituted phenyl.

n is generally mutually independently an integer from 1 to 100, preferably from 1 to 10.

m is generally mutually independently an integer from 1 to 1000, preferably an integer from 1 to 25.

The flame retardant additives of the general formulae (VII) and (VIII) can be present as individual compounds or preferably as mixtures of compounds having various values for n and m.

Particularly preferred compounds of the general formulae (VI) or (VII) in the invention are those selected from the group consisting of resorcinol bis(diphenyl phosphate) (formula (VII), where $R^{19}$, $R^{20}$, $R^{21}$, $R^{22}$ are phenyl, X is oxygen, Q is resorcinol, and n is from 1 to 7), bisphenol A bis(diphenyl phosphate) (formula (VII), where $R^{19}$, $R^{20}$, $R^{21}$, and $R^{22}$ are phenyl, X is oxygen, Q is bisphenol A, and n is from 1 to 5), poly(m-phenylene methylphosphonate) (formula (VIII), where $R^{23}$ and $R^{26}$ are phenol, $R^{24}$ and $R^{25}$ are methyl, L is resorcinol, X is oxygen), and mixtures thereof.

In the invention, at least one metal oxide or semimetal oxide is present in the particles produced. The invention can use any metal oxide or semimetal oxide of those known to a person skilled in the art and that is suitable for producing particles comprising at least one flame retardant.

In one preferred embodiment, the at least one metal oxide or semimetal oxide has been selected from metal oxides or semimetal oxides which respectively can be produced via the sol-gel process known to the person skilled in the art. In one particularly preferred embodiment, the at least one metal oxide or semimetal oxide has been selected from the group consisting of $SiO_2$, $TiO_2$, ZnO, $ZrO_2$, $Al_2O_3$, and mixtures thereof.

The precursor compounds for the abovementioned metal oxides and semimetal oxides are preferably individual monomeric units, or the precursor compounds can be composed of a plurality of monomeric units.

In one particularly preferred embodiment, $SiO_2$ is used in the process of the invention.

The at least one precursor compound of the at least one metal oxide or semimetal oxide is a compound which can be converted to the corresponding metal oxide or semimetal oxide in a sol-gel process known to the person skilled in the art. Suitable compounds are generally any of the precursor compounds which can be converted via the abovementioned sol-gel process into the desired metal oxide or semimetal oxide.

In one preferred embodiment, the precursor compounds used for $SiO_2$ comprise compounds of the general formula (IX):

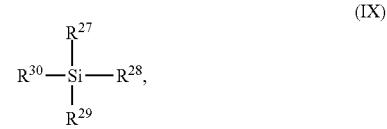

in which $R^{27}$, $R^{28}$, $R^{29}$, and $R^{30}$ are mutually independently hydrogen, alkyl moiety, aryl moiety, alkyloxy moiety, and/or aryloxy moiety.

As far as the alkyl moieties and/or aryl moieties in the compound of the general formula (IX) are concerned, the information above applies. The alkyloxy moieties and/or aryloxy moieties optionally present in the invention in the compounds of the general formula (IX) differ from the abovementioned alkyl moieties and/or aryl moieties in that they have linkage by way of an oxygen atom to the Si atom.

In the compound of the general formula (IX) particular preference is given to $R^{27}$, $R^{28}$, $R^{29}$, and $R^{30}$ mutually independently selected from hydrogen, methyl, ethyl, propyl, such as n-propyl or isopropyl, butyl, such as n-butyl, isobutyl, tert-butyl, phenyl, methoxy, ethoxy, propoxy, such as n-propoxy, isopropoxy, butoxy, such as n-butoxy, isobutoxy, or tert-butoxy, or phenoxy.

Particularly preferred precursor compounds for $SiO_2$ are those selected from the group consisting of tetraalkoxysilanes, for example tetramethoxysilane (TMOS), tetraethoxysilane (TEOS), methyltrialkoxysilanes, for example methyltrimethoxysilane (MTMS), methyltriethoxysilane (MTES) and phenyltrialkoxysilanes, for example phenyltrimethoxysilane (PTMS) and phenyltriethoxysilane (PTES), and mixtures thereof. Preference is given in the invention to mixtures of two or more of the abovementioned compounds, an example being a mixture of tetraethoxysilane (TEOS) and phenyltriethoxysilane (PTES). The quantitative ratio of TEOS to PTES in this mixture that is particularly preferably used is by way of example from 1:1 to 10:1, preferably from 6:1 to 3:1.

Step (A) of the process 1 of the invention comprises producing an aqueous emulsion comprising the at least one flame retardant in at least one precursor compound of the at least one metal oxide or semimetal oxide.

The emulsion can generally be produced in step (A) by any of the processes known to the person skilled in the art for producing emulsions, for example via combination of the appropriate amounts of the individual components.

The emulsion which is produced in step (A) of the process of the invention is aqueous, and water is therefore the main solvent or dispersion medium present.

In one preferred embodiment, the aqueous emulsion of step (A) can comprise at least one surfactant, particularly preferably a nonionic surfactant, for example one selected from the group consisting of alcohol ethoxylates, for example those based on a $C_{12}$-alcohol, for example $C_{12}H_{25}(OCH_2CH_2O)_6OH$, alkylphenol ethoxylates, for example octylphenol ethoxylates, fatty acid ethoxylates, for example RCOO—$(CH_2CH_2O)_nH$, where R=from 12 to 18, and mixtures thereof.

Typical nonionic surfactants which are suitable as emulsifier for the emulsion of the invention are by way of example sorbitan esters and their ethoxylated derivatives, fatty acid ester of sorbitan (known as Span products) and their ethoxylated derivatives (known as Tween products), examples being the monolauric ester of polyoxyethylenesorbitan, the monooleates of polyoxyethylene sorbitan, and monostearates of polyoxyethylenesorbitan.

If a nonionic surfactant or a mixture of nonionic surfactants is used in the invention, the concentration thereof is by way of example from 0.05 to 5% by weight, preferably from 0.5 to 2% by weight, based in each case on the phase immiscible with water, this being the phase formed in the invention by the at least one non-water-soluble flame retardant.

The aqueous emulsion of step (A) can further preferably comprise at least one nonpolar solvent. However, the presence of a nonpolar solvent is not necessary if a flame retardant is used which is mostly soluble in the precursor compound of the at least one metal oxide or semimetal oxide.

The term nonpolar solvents is generally used by the person skilled in the art to mean those solvents whose dielectric constant is less than 15.

In one preferred embodiment of the process of the invention, the nonpolar solvent optionally used in step (A) is a solvent which has a low dielectric constant, for example below 15, and which is not miscible with water. "Not miscible with water" means that combination with water forms two durable phases.

Examples of nonpolar solvents used with preference in the invention are those selected from the group consisting of benzene ($C_6H_6$), carbon tetrachloride ($CCl_4$), diethyl ether ($CH_3CH_2OCH_2CH_3$), pentane, cyclopentane, hexane, cyclohexane, toluene, 1,4-dioxane, chloroform, tetrahydrofuran, dichloromethane, and mixtures thereof.

The individual components of the emulsion of step (A) of process 1 of the invention can generally be mixed in any conceivable sequence with one another.

In one preferred embodiment of step (A) of the process 1, the at least one halogen-free flame retardant is first dissolved in a solution of the at least one precursor compound of the at least one metal oxide or semimetal oxide. The optional at least one nonionic surfactant is preferably then dissolved in water, and said aqueous solution is then combined with the organic solution.

The abovementioned components for producing the emulsion of step (A) can generally be mixed by using a simple mixer or stirrer known to the person skilled in the art. In one preferred embodiment, step (A) is carried out by exposing the emulsion to high shear force with the aim of achieving efficient mixing of the components. In one preferred embodiment, the emulsion of step (A) is produced with exposure to high shear forces or high shear rates. The shear rate is preferably from 5000 to 10 000 rpm.

In another preferred embodiment, a high-pressure homogenization process can be carried out. The energy expended on the emulsion via the high pressure can bring about a number of different rheological effects, examples being cavitation, turbulence, shear, and impact, where this promotes the formation of nanodroplets with homogeneous distribution.

By way of example, step (A) of the process of the invention can be carried out by using a homogenizing valve or comminution chambers, optionally with exposure to high pressure, for example from 500 to 2000 bar, preferably from 800 to 1500 bar. An example of a high-pressure homogenizer is a microfluidizer.

Step (B):

Once an emulsion with the desired oil droplet size has been formed in emulsion step (A), the hydrolysis and polycondensation of the sol-gel precursor is induced at the oil-water phase boundary in step B) of the process preferably via establishment of a suitable pH, for example via addition of acid or of base.

Step (B) of the process 1 of the invention comprises forming core-shell particles, where the at least one flame retardant is present in the core and the at least one metal oxide or semimetal oxide is present in the shell of the particles.

Step (B) can generally be carried out via any of the processes known to the person skilled in the art, where these convert the at least one precursor compound which is used in step (A) and which relates to the at least one metal oxide or semimetal oxide, into the corresponding metal oxide or semimetal oxide.

In one preferred embodiment of the process of the invention, core-shell particles are formed in step (B) via change of pH in the emulsion.

The pH in the invention can be changed via addition of an acid or of a base, and this depends on the pH of the initial emulsion. In one preferred embodiment, an acid is added in step (B) in order to provide an emulsion with pH of from 2 to 6. In another embodiment, a base is added in step (B) of the process of the invention in order to obtain an emulsion with pH of from 8 to 12.

Examples of acids that can be used in step (B) of the process 1 of the invention in order to establish the pH are hydrohalic acids, such as hydrochloric acid (HCl), hydrobromic acid (HBr), hydroiodic acid (HI), and solutions thereof. Other suitable acids are halogen oxo acids, such as hypochlorous acid, chlorous acid, perchloric acid ($HClO_4$), and periodic acid ($HIO_4$). Sulfuric acid ($H_2SO_4$), fluorosulfuric acid, nitric acid ($HNO_3$), phosphoric acid ($H_3PO_4$), fluoroantimonic acid, fluoroboric acid, hexafluorophosphoric acid, and chromic acid ($H_2CrO_4$) are also suitable in the invention. Said acids are preferably used in aqueous solution.

Examples of preferred bases are alkali metal hydroxides, such as sodium hydroxide or potassium hydroxide, alkaline earth metal hydroxides, such as calcium hydroxide, or ammonia. It is particularly preferable to use sodium hydroxide, potassium hydroxide, or ammonia. Said bases are preferably used in aqueous solution.

In one preferred embodiment, step (B) of the process 1 of the invention adjusts the emulsion from step (A) to a particular pH by using a preferably aqueous solution of at least one of the abovementioned acids or bases. This pH is by way of example from 2 to 12, preferably from 2 to 6, or from 8 to 12. It is very particularly preferable to establish a pH of from 8 to 10.

Step (B) can generally be carried out at a temperature of from 10 to 80° C. In one preferred embodiment, step (B) is carried out for at least two hours, for example from 2 to 16 hours.

In one preferred embodiment, there are no other components present alongside the liquid, halogen-free flame retardant in the core of the particle produced in the invention. In one particularly preferred embodiment, the concentration of the at least one liquid, halogen-free flame retardant, based on the total weight of the core, is at least 50% by weight, particularly preferably at least 60% by weight.

In one preferred embodiment, the core of the particle to be produced in the invention is a liquid core, and the core is very particularly preferably a liquid, oily core.

The preferred amount of the at least one liquid flame retardant present in the core of the core-shell particle to be produced in the invention is from 50 to 99% by weight, particularly from 60 to 90% by weight in the particle, based in each case on the entire particle. The preferred amount of the at least one metal oxide or semimetal oxide present in the core of the core-shell particle to be produced in the invention is from 1 to 50% by weight, particularly from 10 to 40% by weight in the particle, based in each case on the entire particle. In one preferred embodiment, the total of the amounts of at least one flame retardant and of at least one metal oxide or semimetal oxide is 100% by weight.

Step B) can be followed by process steps known to the person skilled in the art, for example centrifuging, filtering, evaporation, resuspension in an aqueous medium, or dialysis. Said optional steps of the process serve to isolate the resultant core-shell particles from the liquid components of the emulsion of the invention.

Step (C):

The optional step (C) of the process 1 of the invention comprises drying of the core-shell particles from step (B).

The optional step (C) of the invention is preferably carried out when the core-shell particles obtained from step (B) have a proportion of water or of other organic solvents that is too high for further processing, for example for producing a polymer molding composition.

In the invention, step (C) can be carried out by using any of the processes known to the person skilled in the art, for example spray drying.

The diameter of the particles produced via the process 1 in the invention is by way of example from 0.1 to 100 μm, preferably from 0.2 to 20 μm, particularly preferably from 0.5 to 5 μm. In the invention, diameter means the maximum distance within the particles produced in the invention.

The present invention also provides a process 2, comprising at least the steps (D), (E), and (F). These steps are explained in detail below:

Step (D):

Step (D) comprises producing a mixture comprising water, at least one polar solvent, at least one halogen-free flame retardant, and at least one precursor compound of the at least one metal oxide or semimetal oxide.

The step (D) of the invention uses at least one polar solvent. The invention can use any of the polar solvents known to the person skilled in the art. A polar solvent in the invention is a solvent whose dielectric constant is above 15.

In one particularly preferred embodiment of the process of the invention, the at least one polar solvent in step (D) is at least one alcohol.

Suitable alcohols are those selected from the group consisting of methanol, ethanol, propanols, such as n-propanol, isopropanol, butanols, such as n-butanol, isobutanol, tert-butanol, pentanols, such as n-pentanol, isopentanol, tert-pentanol, methylpentanol, n-hexanol, dimethylbutanol, ethylbutanol, n-heptanol, n-octyl alcohol, n-nonyl alcohol, n-decyl alcohol, etc.

The amount of the at least one polar solvent present in the mixture is generally from 10 to 60% by weight, preferably from 20 to 50% by weight, particularly preferably from 30 to 40% by weight, based in each case on the entire mixture.

Water is also present in the mixture provided in step (D) of the process 2 of the invention. The amount of water generally present is from 5 to 35% by weight, preferably from 10 to 30% by weight, particularly preferably from 15 to 25% by weight, based in each case on the entire mixture.

As far as the at least one halogen-free flame retardant is concerned, and as far as the at least one precursor compound of the at least one metal oxide or semimetal oxide is concerned, the information above in relation to step (A) of process 1 applies.

The amount of the at least one halogen-free flame retardant present in the mixture is generally from 5 to 40% by weight, preferably from 10 to 30% by weight, particularly preferably from 15 to 25% by weight, based in each case on the entire mixture.

The amount of the at least one precursor compound of the at least one metal oxide or semimetal oxide present in the mixture is generally from 10 to 60% by weight, preferably from 20 to 50% by weight, particularly preferably from 30 to 40% by weight, based in each case on the entire mixture.

The amounts of components present in the mixture of step (D) of the process 2 of the invention give a total of 100% by weight.

In one preferred embodiment, the mixture produced in step (D) of the process 2 of the invention can comprise a buffer solution.

For the purposes of the present invention, a buffer solution is a mixture of a weak acid and of its conjugate base, or of a weak base and of its conjugate acid. When a buffer solution is used, the change in pH when a small amount of a strong acid or base is added can be only small. Buffer solutions are used in order to keep the pH of a solution to an almost constant value. Examples of buffer solutions are aqueous solutions of hydrochloric acid and sodium citrate, citric acid and sodium citrate, acetic acid and sodium acetate, $K_2HPO_4$ and $KH_2PO_4$, $Na_2HPO_4$ and $NaH_2PO_4$, and borax and sodium hydroxide, preferably borax and sodium hydroxide.

All components present in the mixture of step (D) of the process 2 of the invention can be mixed with one another in a manner known to the person skilled in the art, for example by using a magnetic stirrer.

The stirrer speed here is generally from 100 to 600 rpm, preferably from 200 to 500 rpm, particularly preferably about 300 rpm. The stirring time is sufficiently long, for example from 2 to 10 minutes.

Step (E):

Step (E) of the process 2 of the invention comprises converting the at least one precursor compound of the at least one metal oxide or semimetal oxide to the at least one metal oxide or semimetal oxide, in order to obtain a particle which comprises at least one metal oxide or semimetal oxide and which comprises at least one halogen-free flame retardant.

The conversion of the at least one precursor compound of the at least one metal oxide or semimetal oxide to the at least one metal oxide or semimetal oxide in step (E) of the process of the invention can take place by any of the processes known to the person skilled in the art.

In one preferred embodiment, step (E) takes place via heating of the mixture from step (D). In this embodiment, the mixture is generally heated to a temperature of from 30 to 100° C., preferably from 40 to 80° C. The heating process can take place in any of the reactors known to the person skilled in the art, for example in a stirring hotplate known to the person skilled in the art. The method of heating in step (E) preferably permits escape of solvents, i.e. water and/or polar solvent.

The heating in step (E) preferably forms a gel from the liquid mixture.

After formation of the gel, drying can also take place in step (E) of the process 2 of the invention. Said drying is preferably carried out in order to remove solvents present, i.e. water and/or polar solvent, from the particles. When said optional drying process is carried out, aging of the gel also takes place, forming the particles. The drying process generally takes place at a temperature of from 100 to 200° C., for example in a spray dryer.

Because step (D) of the process of the invention produces a mixture which is in essence homogeneous, step (E) forms particles which comprise the at least one halogen-free flame retardant and the at least one metal oxide or semimetal oxide with in essence homogeneous distribution.

Step (F):

The optional step (F) of the process of the invention comprises drying of the particles from step (E).

In one preferred embodiment of the process of the invention, step (F) is carried out.

It is preferable that, in step (F), the respective specimens from step (E) are respectively first spray-dried to remove the water, by using a B-290 mini spray dryer (Buchi, Switzerland) in order to remove the water. The conditions used for the spray drying process are preferably as follows: inlet temperature by way of example about 80 to 150° C., preferably from 110 to 130° C., e.g. 120° C.; outlet temperature by way of example about 40 to 65° C., preferably from 45 to 60° C., e.g. 55° C. It is preferable to use a twin-fluid nozzle. Preference is further given to the use of nitrogen as spraying gas.

The particle size of the fine powder obtained in step (F) is by way of example from 0.1 to 50 µm, preferably from 0.5 to 20 µm, particularly preferably from 1 to 5 µm.

The present invention also provides particles comprising at least one halogen-free flame retardant and one metal oxide or semimetal oxide, selected from the group consisting of $SiO_2$, $TiO_2$, $ZnO$, $ZrO_2$, $Al_2O_3$, and mixtures thereof.

As far as the halogen-free flame retardants and the above-mentioned metal oxides or semimetal oxides are concerned, the information given above in relation to the processes 1 and 2 of the invention applies. In one particularly preferred embodiment, the at least one metal oxide or semimetal oxide is $SiO_2$. The at least one halogen-free flame retardant is particularly preferably one selected from the group consisting of triphenylphosphine, diphenyl(o-tolyl)phosphine, tributylphosphine oxide, trioctylphosphine oxide, diphenyl phosphite, triphenyl phosphite, tris(nonylphenyl) phosphite, dimethyl methylphosphonate, dioctyl phenylphosphonate, triphenyl phosphate, tritolyl phosphate, resorcinol bis(diphenyl phosphate), bisphenol A bis(diphenyl phosphate), poly (m-phenylene methylphosphonate) (formula (VIII)), and mixtures thereof.

In one preferred embodiment, the present application also provides a particle of the invention which is a core-shell particle in which the at least one halogen-free flame retardant is present in the core and the at least one metal oxide or semimetal oxide is present in the shell. In this embodiment, the amount of at least one halogen-free flame retardant in the particle is preferably more than 50% by weight, particularly preferably more than 70% by weight, based in each case on the entire particle.

The ratio of the average thickness of the shell to the average diameter of the capsule is preferably from 1:20 to 1:200, particularly preferably from 1:50 to 1:100.

In another preferred embodiment, the present invention also provides a particle of the invention, wherein the at least one halogen-free flame retardant and the at least one metal oxide or semimetal oxide comprised are in essence in homogeneous dispersion. In this embodiment, it is preferable that the amount of at least one halogen-free flame retardant in the particle is more than 70% by weight, based in each case on the entire particle.

An advantage of the particles produced in the invention is that they can be incorporated into a polymeric molding composition more easily, in terms of process technology, than is possible when liquid flame retardants are used. By way of example, the use of the particles of the invention can avoid adhesive effects on the tooling used to produce the molding composition. Another advantage is that when the particles of the invention are used in polymeric molding compositions it is possible to avoid the undesired plasticizing effect of the flame retardants, since these are used in a form bound with a metal oxide or semimetal oxide, rather than in liquid form. Furthermore, the flame retardants used have more effective flame retardant action in the form of the invention than in free form. The invention can moreover prevent the type of leaching out of the flame retardants from polymer molding compositions that can occur when liquid flame retardants are used.

The present invention also provides a polymer molding composition comprising particles of the invention and comprising at least one thermoplastic or thermoset polymer.

Any of the polymers known to the person skilled in the art can be present in the polymer molding composition of the invention, examples being those selected from the group consisting of polyester, such as poly(ethylene terephthalate), poly(butylene terephthalate), poly(trimethyleneterephthalate), poly(cyclohexenedimethylene terephthalate), or polyesters derived from alkyl diacid, for example adipic acid, polyamides, such as nylon-6, nylon-6,6, or other types of polyamide, polyolefins, such as polyethylene, polypropylene, poly(vinyl chloride), poly(vinyl acetate), poly(vinyl alcohol), poly(methyl methacrylate), polyacrylate, polystyrene, poly(acrylonitrile-butadiene-styrene), polyurethanes, polycarbonates, epoxy resins, optionally crosslinked, unsaturated polyesters, and mixtures and, respectively, blends of said polymers.

The amount of the particles of the invention generally present in the polymer molding composition of the invention is from 1 to 50% by weight, preferably from 1 to 30% by weight, based in each case on the entire polymer molding composition.

Nitrogen-comprising synergists can optionally be present in the polymer molding composition of the invention, examples being melamine, melam, melem, melamine cyanurate, melamine polyphosphate, ammonium phosphate, ammonium pyrophosphate, ammonium polyphosphate, and mixtures thereof. The amount of these nitrogen-containing synergists preferably present is from 0 to 50% by weight, preferably from 1 to 50% by weight, particularly preferably from 1 to 30% by weight, based in each case on the entire polymer molding composition.

Antidrip reagents can optionally be present in the polymer molding composition of the invention, as also can other synergists, such as poly(tetrafluoroethylene), zinc oxide, zinc borate, silica, silicates, epoxides, and mixtures thereof. The amount preferably present in these additives is from 0 to 10% by weight, preferably from 0.2 to 10% by weight, particularly preferably from 0.2 to 4% by weight, based in each case on the entire polymer molding composition.

Other halogen-free flame retardants can optionally be present in the polymer molding composition of the invention. The amount of said other optionally present halogen-free flame retardants is by way of example from 0 to 30% by weight, preferably from 0 to 20% by weight. By way of example, these flame retardants are metal phosphinates or metal hydroxides.

Other polymer additives can optionally be present in the polymer molding composition of the invention, for example in order to improve flame-retardant effect, mechanical properties, electrical properties, or chemical and hydrolysis properties, etc. Said polymers comprise by way of example epoxy polymers, polyacrylates, rubbers, silicones, maleic-anhydride-modified polymers, etc. The preferred amount present of these additives is from 0 to 50% by weight, preferably from 1 to 50% by weight, particularly preferably from 5 to 20% by weight, based in each case on the entire polymer molding composition.

Glass fibers can also optionally be present in the polymer molding composition of the invention. The preferred amount present of said glass fibers is from 0 to 80% by weight, preferably from 15 to 30% by weight, based in each case on the entire polymer molding composition.

Other additives optionally present are those selected from the group consisting of lubricants, nucleating agents, stabilizers, crosslinking agents, etc.

The present invention also provides a process for producing the polymer molding composition of the invention via mixing of the particles and of the at least one thermoplastic or thermoset polymer.

When thermoplastic polymers are used, the mixing process can generally use any of the processes known to the person skilled in the art, an example being mixing in the melt. It is possible to use mixers, kneaders, extruders, and blenders known to the person skilled in the art, preferably extruders. Single- or twin-screw extruders can be used with various diameters and capacities. The individual components are preferably mixed with one another in the melt. The resultant thermoplastic molding composition can then be converted to pellets, for example by chopping. It is possible in the invention to produce moldings from said pellets, for example via injection molding. These processes are known to the person skilled in the art.

When thermoset polymers are used, examples being epoxy resins or optionally crosslinked, unsaturated polyesters, the components can be reacted with one another in a standard process comprising mixing and curing, or in other known processes. The abovementioned processes are known to the person skilled in the art.

The present invention also provides the use of a particle of the invention in polymer molding compositions.

The present invention also provides the use of a particle of the invention for providing flame retardancy to polymer molding compositions.

As far as the inventive use is concerned, the information given above in relation to the particles of the invention and in relation to the molding composition of the invention applies.

EXAMPLES

The following abbreviations are used in the examples:
TEOS Tetraethoxysilane
PTES Phenyltriethoxysilane
RDP Bis(diphenyl phosphate),
PMP Poly(m-phenylene methylphosphonate),
PC Polycarbonate
SAN Polystyrene-acrylonitrile comprising 76% by weight of styrene and 24% by weight of acrylonitrile,
ABS Poly(acrylonitrile-butadiene-styrene) comprising 38% by weight of styrene, 12% by weight of acrylonitrile, and 50% by weight of butadiene,
PTFE Poly(tetrafluoroethylene),
Ultradur B4300 G6 Poly(butylene terephthalate) resin comprising 30% by weight of glass fibers. The intrinsic viscosity of this resin is 130 mL/g, measured on a 0.5% strength by weight solution in phenol/o-dichlorobenzene, 1:1 mixture,
MC Melamine cyanurate,
Silica is used as Aerosol 8200.

Example 1

Encapsulation of RDP in a Core-Shell Structure 12 g of RDP are dissolved at room temperature in 12 g of TEOS solution. 0.6 g of Tween 80 are dissolved in 144 g of water. The oil phase is homogenized with the water phase with use of a high-pressure homogenizer (M-110 F microfluidizer, Mikrofluidix) at a pressure of 500 bar for one minute. The finished emulsion is transferred to a 1 L glass beaker equipped with a magnetic stirrer (300 rpm). 8 g of citric acid-sodium hydroxide solution-sodium chloride buffer solution (pH 4) are added as catalyst, and the emulsion is stirred for 10 hours. The suspension is dried by means of a spray dryer, and a fine powder is obtained.

A Bluewave (Microtrack S3500 Bluewave, Microtrack) is used to measure the particle size distribution, which is found to be: $D50=0.5$ μm, $D90=1.0$ μm.

The product is calcined in vacuo for 20 minutes at 280° C. in order to remove residual moisture and surfactants. The final product is used as compound A in the following examples. After calcination, compound A comprises 7.9% by weight of phosphorus, indicating an RDP charging level of 73% by weight.

Example 2

Encapsulation of RDP in a Core-Shell Structure 12 g of RDP are dissolved at room temperature in 9 g of TEOS solution and 3 g of PTES solution. 0.6 g of Tween 80 are dissolved in 144 g of water. The oil phase is homogenized with the water phase with use of a high-pressure homogenizer (M-110 F microfluidizer, Mikrofluidix) at a pressure of 500 bar for one minute. The finished emulsion is transferred to a 1 L glass beaker equipped with a magnetic stirrer (300 rpm). 8 g of citric acid-sodium hydroxide solution-sodium chloride buffer solution (pH 4) are added as catalyst, and the emulsion is stirred for 16 hours. The suspension is dried by means of a spray dryer, and a fine powder is obtained.

A Bluewave (Microtrack S3500 Bluewave, Microtrack) is used to measure the particle size distribution, which is found to be: $D50=0.6$ μm, $D90=1.2$ μm.

Example 3

Encapsulation of RDP into a Matrix Structure 20 g of RDP are dissolved at room temperature in 30 g of TEOS solution and 10 g of PTES solution. The mixture is dissolved in 20 g of ethanol. The oil phase is added to 20 g of citric acid-sodium hydroxide solution-sodium chloride buffer solution (pH 4). The solution is stirred for 2 minutes with a magnetic stirrer (300 rpm). The solution is transferred to a stirring hotplate using a temperature of 40° C., for 10 hours. The suspension is dried by means of a spray dryer, and a fine powder is obtained. A Bluewave (Microtrack S2500 Bluewave, Microtrack) is used to measure the particle size distribution, which is found to be: D50=1.0 μm, D90=1.6 μm.

Example 4

Encapsulation of PMP in a Matrix Structure 13 g of PMP are dissolved at 60° C. in 10 g of TEOS solution and 3 g of PTES solution. The mixture is immediately added to ethanol. 60 g of citric acid-sodium hydroxide solution-sodium chloride buffer solution (pH 4) are heated to 60° C. The oil phase is mixed at 60° C. with the aqueous phase, and the mixture is stirred for two minutes. The solution is transferred to a stirring hotplate, using a temperature of 80° C., for ten hours. The suspension is dried by means of a spray dryer, and a fine powder is obtained. A Bluewave (Microtrack S3500 Bluewave, Microtrack) is used to measure the particle size distribution, which is found to be: D50=1.5 μm, D90=2.5 μm.

The product is calcined in vacuo for 20 minutes at 280° C. in order to remove residual moisture and surfactant. The final product is used as compound B in the following examples. After calcination, compound B comprises 12.9% by weight of phosphorus, indicating a PMP charging level of 72% by weight.

Example 5

Use of RDP in FR PC/ABS (Comparison)

Table 1 shows the FR PC/ABS composition. The materials are mixed using a screw rotation rate of 80 rpm in a 17 mL miniextruder for three minutes at 280° C. and are then cast into an injection mold under a pressure of 15 bar in an injection molding process in order to produce UL 94 specimens measuring 1.6 mm. The resulting specimens are tested in accordance with UL 94 conditions (two sequential flame applications lasting 10 seconds), and complied with the requirement for V-0 by achieving self-extinguishment with no flaming drops. During the mixing process, the RDP sticks to the feeder and is difficult to meter. The heat distortion temperature of the test specimen is low, 85° C., and this indicates the plasticizer effect of the RDP.

Example 6

Use of Encapsulated RDP with a Core-Shell Structure (Compound A) FR PC/ABS

Compound A is produced as described in example 1. Table 1 shows the FR PC/ABS composition. The method of processing and testing the materials is the same as in example 5. Compound A is used in powder form and is easy to meter. The specimens produced self-extinguish without flaming drops and are classifiable as V-0. The heat distortion temperature of the test specimens is 92° C., and this indicates that encapsulation can mitigate the plasticizer effect of liquid RDP.

TABLE 1

Composition and properties of FR PC/ABS

|  | Example 5 (comparison) | Example 6 |
|---|---|---|
| PC | 73.8 | 69.6 |
| SAN | 9 | 8.5 |
| ABS | 6.7 | 6.4 |
| PTFE | 0.5 | 0.5 |
| RDP | 10 | — |
| Compound A | — | 15 |
| UL 94 | V-0 | V-0 |
| Combustion behavior | self-extinguishing | self-extinguishing |
| HDT/A (° C.) | 85 | 92 |

Example 7

Use of PMP in FR PBT (Comparison)

Table 2 shows the FR PBT composition. The materials are mixed using a screw rotation rate of 80 rpm in a 17 mL miniextruder for three minutes at 260° C. and are then cast into an injection mold under a pressure of 15 bar in an injection molding process in order to produce UL 94 specimens measuring 1.6 mm. During the mixing process, the PMP has a tendency to stick to the feeder, and is difficult to meter. The mold fill ratio during the injection process in the melt is 60%. The specimens produced are tested to UL 94 and undergo complete combustion, the corresponding UL 94 class being V—. By virtue of the plasticizer effect of the PMP, the glass transition temperature of the composite is 27° C., markedly lower than that of standard PBT (40° C.).

Example 8

Uses of PMP in FR PBT (Comparison)

Table 2 shows the FR PBT composition with silica and PMP loading levels as in example 9. The levels for processing and testing of the material are the same as in example 7. During the mixing process, the PMP tends to stick to the feeder, and is difficult to meter. The mold fill ratio during the injection process in the melt is 50%, less than in example 7, and this indicates that the presence of silica increases the melt viscosity of the polymer. The specimens produced are tested to UL 94 and achieve self-extinguishment, without any flaming drops, thus achieving V-0 classification. The glass transition temperature of the composite is 30° C.

Example 9

Uses of Encapsulated PMP with a Matrix Structure (Compound B) in FR PBT

Compound B is produced as described in example 5. Table 2 shows the FR PBT composition. The method of processing and testing the materials is the same as in example 7. Compound B is pulverulent and is easy to meter. The mold fill ratio is 60%, the same as in example 7, but higher than in example 8, and this indicates that there is no change in the melt viscosity of the encapsulated PMP. The specimens produced are tested to UL 94 and are self-extinguishing, without flaming drops, thus achieving V-0 classification, a much better result than in example 7. The encapsulated PMP is a better flame retardant than the liquid PMP. The glass transition temperature of the composite is 36° C., which is higher than in examples 7 and 8, because encapsulation of the PMP mitigates its plasticizing effects.

TABLE 2

Composition and properties of FR PBT

|  | Example 7 (comparison) | Example 8 (comparison) | Example 9 |
|---|---|---|---|
| PBT Ultrador B6400 G6 | 75 | 70 | 70 |
| MC | 15 | 15 | 15 |
| PMP | 10 | 11 | — |
| Silica | — | 4 | — |
| Compound B | — | — | 15 |
| UL94 1.6 mm | V-- | V-0 | V-0 |
| Combustion behavior | complete combustion | self-extinguishing | self-extinguishing |
| Flaming drops | yes | no | no |
| Melt mold-fill ratio | 60% | 50% | 60% |
| Glass transition temperature (° C.) | 27 | 30 | 36 |

The invention claimed is:

1. A process for producing particles which comprise at least one halogen-free flame retardant which is liquid under standard conditions and at least one metal oxide or semimetal oxide, which comprises the following steps:
   (A) producing an aqueous emulsion comprising the at least one flame retardant and at least one precursor compound of the at least one metal oxide or semimetal oxide,
   (B) forming core-shell particles, where the at least one flame retardant is present in the core and the at least one metal oxide or semimetal oxide is present in the shell of the particles, where the at least one flame retardant is present in the core and the at least one metal oxide or semimetal oxide is present in the shell of the particles, and
   (C) optionally drying the core-shell particles from step (B), wherein the at least one halogen-free flame retardant is triphenylphosphine, diphenyl(o-tolyl)phosphine, tributylphosphine oxide, trioctylphosphine oxide, diphenyl phosphite, triphenyl phosphite, tri(nonylphenyl)phosphite, dimethyl methylphosphonate, dioctyl phenylphosphonate, triphenyl phosphate, tritolyl phosphate, or mixtures thereof,
   or
   is resorcinol bis(diphenyl phosphate), bisphenol A bis(diphenyl phosphate), poly(m-phenylene methylphosphonate), or mixtures thereof,
   wherein the at least one metal oxide or semimetal oxide is $SiO_2$, $TiO_2$, ZnO, $ZrO_2$, $Al_2O_3$, or mixtures thereof.

2. The process according to claim 1, wherein, in step (B), core-shell particles are formed via change of the pH of the emulsion.

3. A particle having a core-shell structure comprising at least one halogen-fee flame retardant, which is liquid under standard conditions, wherein the at least one halogen-free flame retardant is triphenylphosphine, diphenyl(o-tolyl)phosphine, tributylphosphine oxide, trioctylphosphine oxide, diphenyl phosphite, triphenyl phosphite, tri(nonylphenyl)phosphite, dimethyl methylphosphonate, dioctyl phenylphosphonate, triphenyl phosphate, tritolyl phosphate, or mixtures thereof, or
   is resorcinol bis(diphenyl phosphate), bisphenol A bis(diphenyl phosphate), poly(m-phenylene methylphosphonate), or mixtures thereof and one metal oxide or semimetal oxide is $SiO_2$, $TiO_2$, ZnO, $ZrO_2$, $Al_2O_3$, or mixtures thereof, wherein the at least one halogen-free flame retardant is present in the core and the at least one metal oxide or semimetal oxide is present in the shell.

4. The particle according to claim 3, wherein the concentration of the core material, based on the total weight of the particle, is higher than 50% by weight.

5. A polymer molding composition comprising the particle according to claim 3 and at least one thermoplastic or thermoset polymer.

6. A process for producing the polymer molding composition according to claim 5 via mixing of the particles and of the at least one thermoplastic or thermoset polymer.

7. A polymer molding composition which comprises the particle according to claim 3.

8. A process for providing flame retardancy to polymer molding composition which comprises utilizing the particle according to claim 3.

* * * * *